Nov. 15, 1927.

W. K. McQUOWN

STEERING WHEEL

Filed Jan. 4, 1923      5 Sheets-Sheet 1

1,649,359

Inventor
William K. McQuown,
By
Attorney

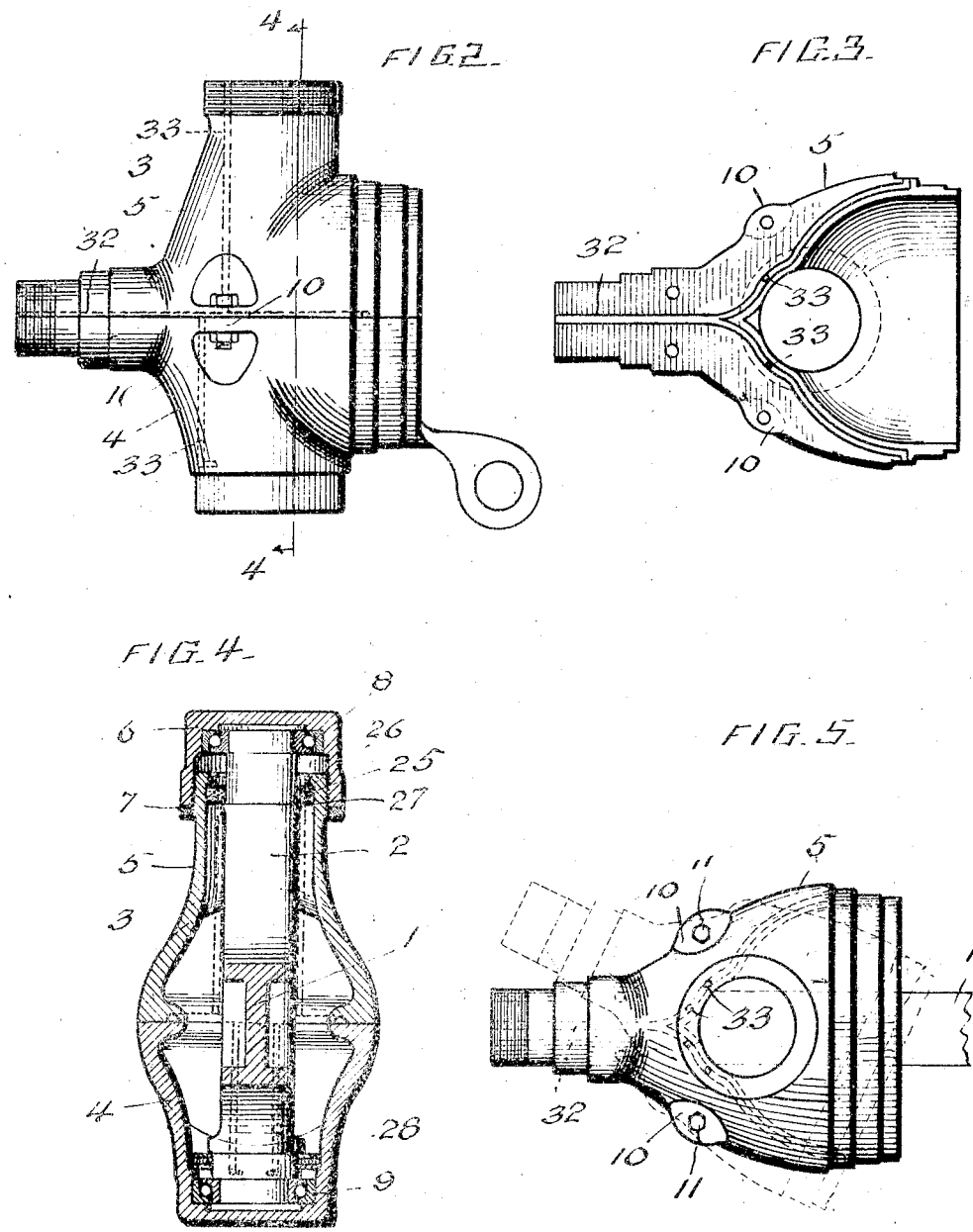

Nov. 15, 1927.  
W. K. McQUOWN  
STEERING WHEEL  
Filed Jan. 4, 1923
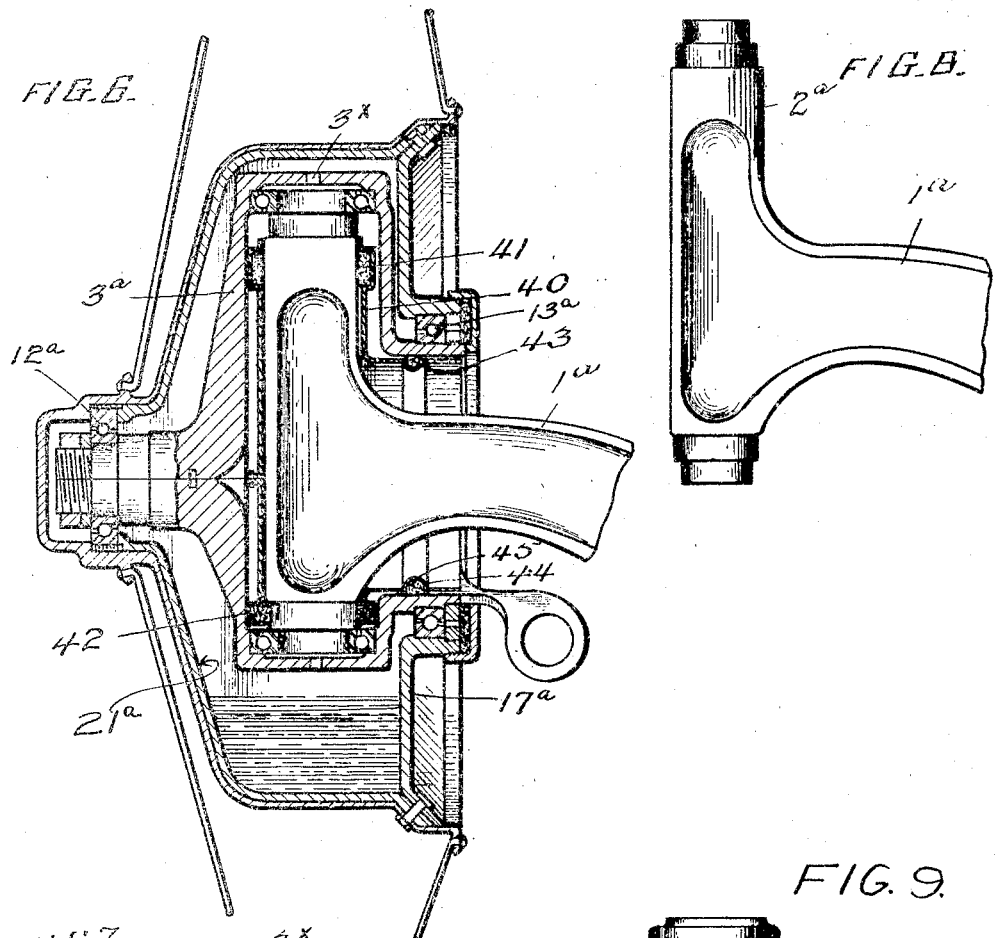
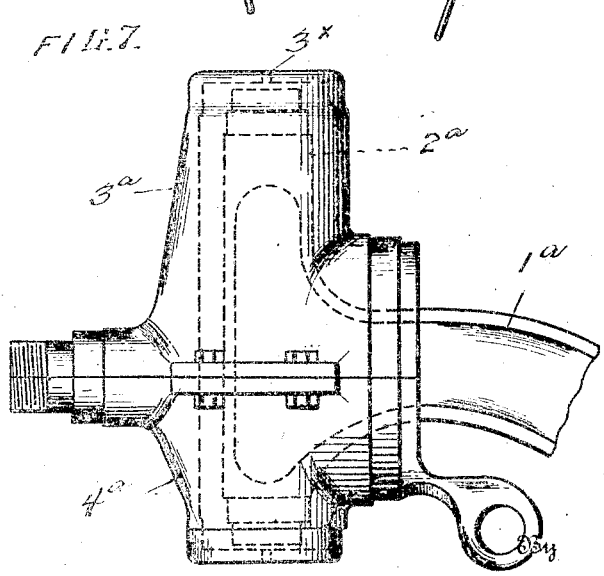
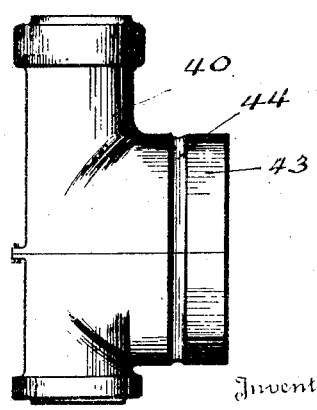
Inventor  
William K. McQuown

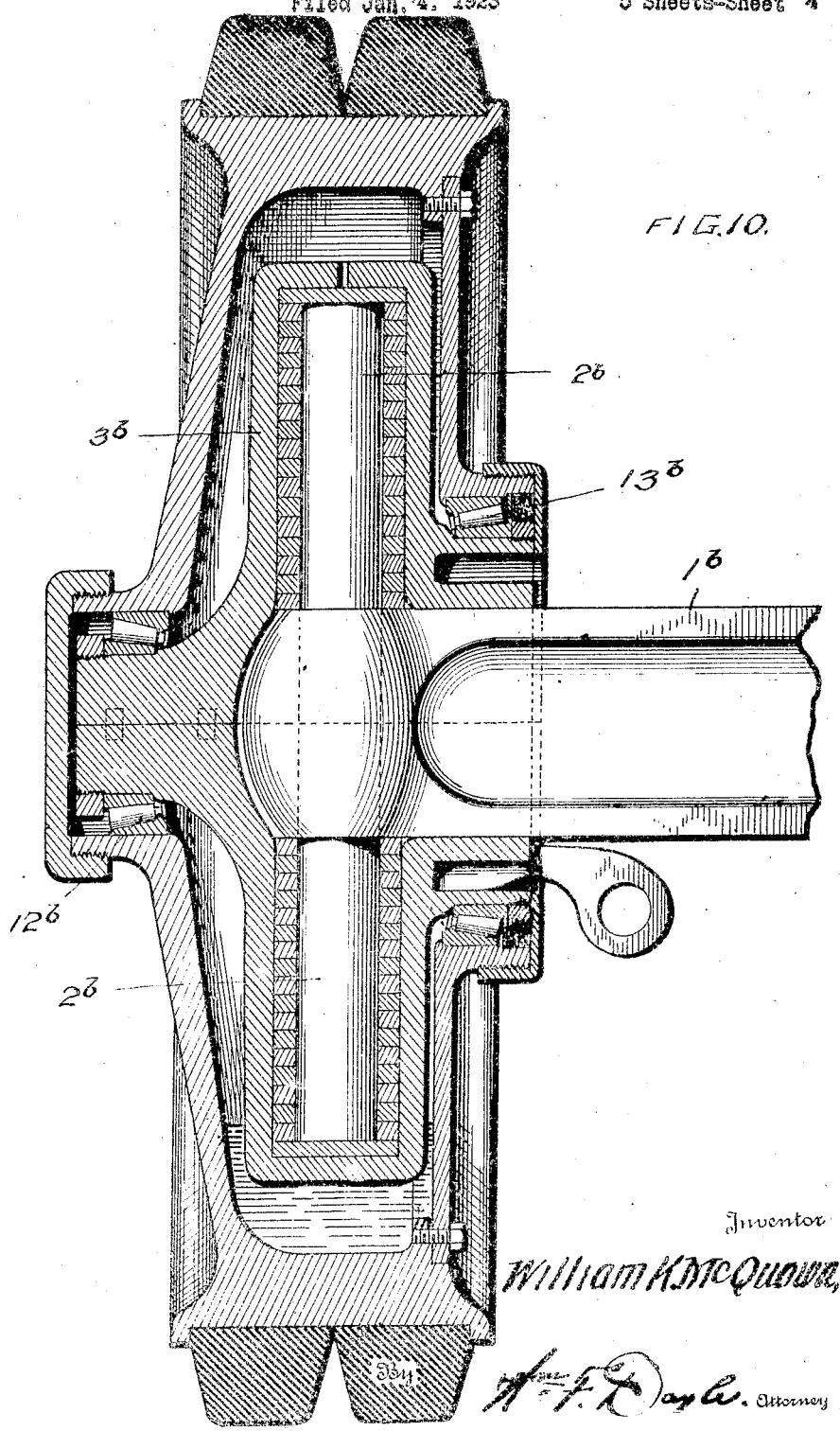

Nov. 15, 1927. 1,649,359
W. K. McQUOWN
STEERING WHEEL
Filed Jan. 4, 1923 5 Sheets-Sheet 5
FIG. 11.
FIG. 12.
FIG. 13.
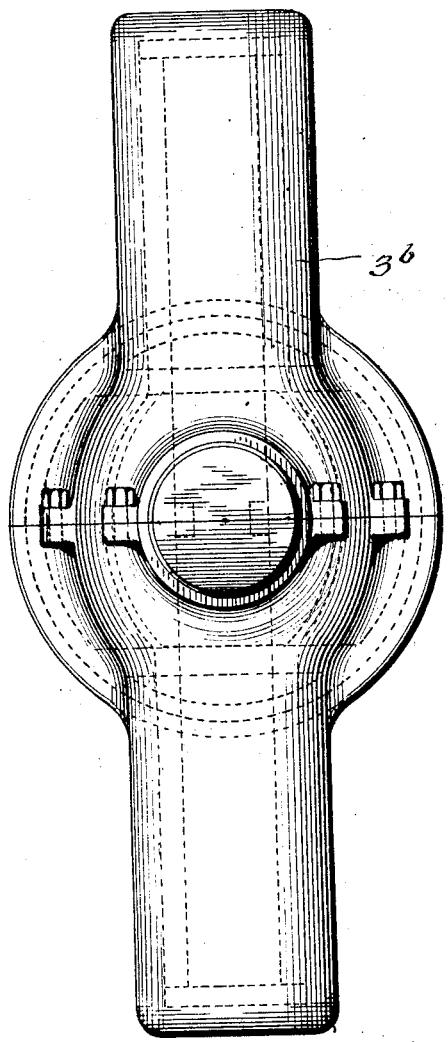
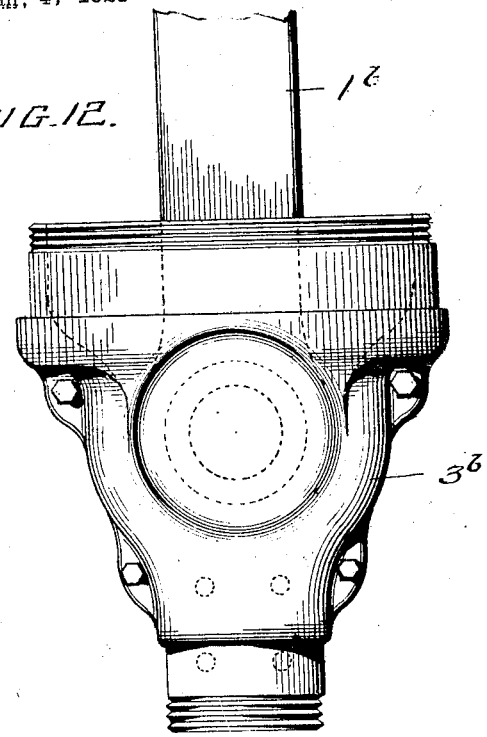
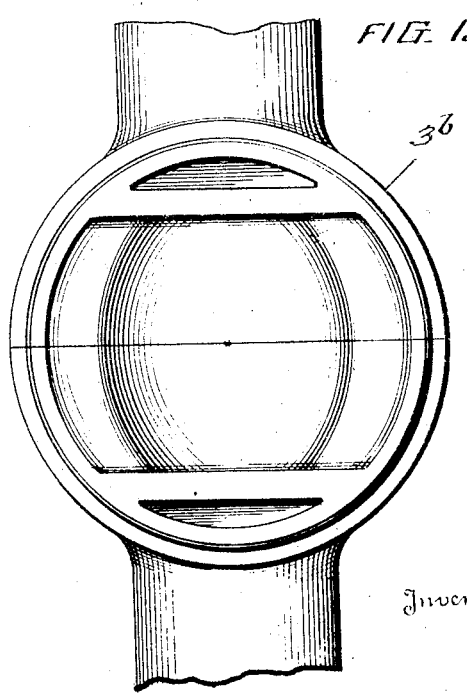
Inventor
William K. McQuown.
By Patented Nov. 15, 1927.

1,649,359

UNITED STATES PATENT OFFICE.

WILLIAM K. McQUOWN, OF BROOKLYN, NEW YORK.

STEERING WHEEL.

Application filed January 4, 1923. Serial No. 610,713.

This invention relates to an improvement in steering wheels for motor vehicles, and more particularly to a type that is pivoted within the hub, directly above the point at which the tread of the wheel comes into contact with the ground.

The object is to provide a simple, durable and inexpensive structure in which the parts are kept thoroughly oiled, and may be quickly disassembled for cleaning or replacement, and at the same time to provide a structure that is capable of withstanding the severe strain placed upon it, especially in its use on trucks.

A further object is to provide a steering wheel structure in which the bearings are all up away from the ground, or sufficiently close to the center of the hub to prevent, as far as possible, the collection of mud or other foreign matter in the bearings. Said arrangement also provides against the severe shock to the bearings that is the result, when same are placed adjacent to the tread, there being no intervening parts connecting the tread and the hub in said last mentioned construction to absorb a part of the shock and avoid fracture of the race or balls of the bearing.

The outer and inner bearings of the hub in this construction are placed at points, in relation to the stresses and strains, that practice has proven to be the most advantageous, said location of bearings being made possible by the peculiar construction here shown.

With the foregoing and other objects in view, the invention consists of certain novel features of construction, combination and arrangement of parts, as will be more fully described and particularly pointed out in the appended claims.

Similar numerals indicate corresponding parts in all the figures of the drawings in which:

Fig. 2 is a detailed side elevation of the oscillating spindle.

Fig. 3 is an inverted plan of the upper half of the oscillating spindle.

Fig. 4 is a vertical section on line 4—4 of Fig. 2, of the oscillating spindle showing the vertical T-head at end of axle in place therein.

Fig. 5 is a plan view of the oscillating spindle.

Fig. 6 is a fragmentary vertical section of the improved hub showing a modified form of lubricating means.

Fig. 7 is a detailed side elevation of the oscillating spindle shown in Fig. 6.

Fig. 8 is a detailed side elevation of the vertical T-head at the end of axle.

Fig. 9 is a detailed side elevation of the sheet metal casing, or oil retainer, as shown in Fig. 6.

Fig. 10 is a vertical section of a slightly modified form of steering wheel, especially designed for heavy duty.

Fig. 11 is an elevation of the oscillating spindle, shown in Fig. 10, taken from its outer face.

Fig. 12 is a plan view of the part shown in Fig. 11.

Fig. 13 is an elevation of the oscillating spindle taken from its inner face.

Figure 1:
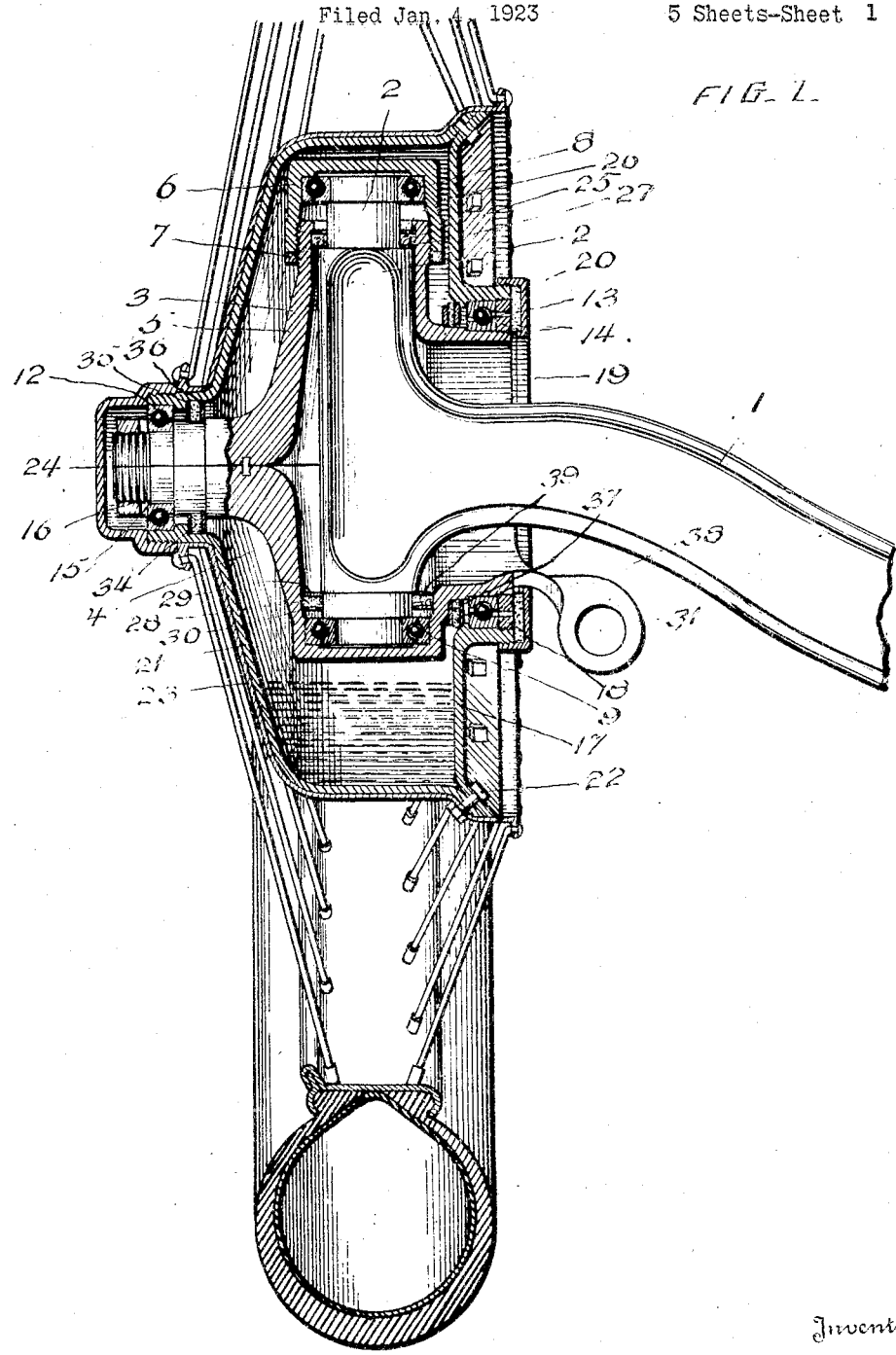
Fig. 1 is a vertical section taken through the improved steering wheel.

Referring to the drawings by numerals, the axle of the vehicle as shown at 1, may be of any preferred shape in cross section, but is shown here as an I-beam, which shape has been most generally adopted in automobile manufacturing practice. The axle has at its end a substantially vertical T-head 2, which may be an integral part of the axle, as shown, or may be firmly attached to the axle. When integral with an axle of the I-beam form, the channels of the I-beam extend upward and downward on the sides of the T-head 2, thus reducing the weight of the T-head, without substantially reducing its strength.

Surrounding the end of the axle and mounted on anti-friction pivot bearings 8 and 9, on the upper and lower ends of the T-head is a hollow steering spindle assembly 3, which is divided horizontally into two parts 4 and 5, the upper part 5 being threaded at its upper end to receive the spindle adjusting cap 6 and lock ring 7. It will be seen that the whole steering spindle assembly 3 may be oscillated on pivot bearings 8 and 9 on the T-head, and that by the adjustment of the spindle cap 6 and lock ring 7, any wear in bearings 8 and 9 may be compensated for.

The anti-friction pivot bearings at 8 and 9 are not essential to this invention, but are preferred. Likewise, the adjusting cap 6 and lock ring 7 may be dispensed with if the upper part 5 of the steering spindle be extended upward to form in itself a closed recess to form a bearing seat for the upper end of the axle T-head, adjustment being taken care of by adding thin metal shims as the parts become loose from wear. The adjusting cap arrangement is shown, however, as being preferred.

The steering spindle 3 is divided into parts 4 and 5, for convenience of assembly, and these parts are held together during assembly by bolts 11 through lugs 10, and after complete assembly, are further held in rigid relation by outer wheel hub bearing 12 and inner wheel hub bearing 13, lock ring 14, bearing seat nut 15, and nut 16. The steering knuckle is thus, after assembly, a rigid unit.

Surrounding the inner end of the steering spindle and carrying the outer member of the inner wheel hub bearing 13, is a wheel hub bearing plate 17, which is internally threaded to receive an externally threaded retaining nut 18, and is externally threaded to receive dust washer retaining nut 19, which holds in position a dust washer 20, of felt or other suitable material. This dust washer serves the double purpose of retaining lubricant for bearing 13, and excluding dust and dirt from said bearing.

The outer wheel hub bearing plate 21 has mounted therein the outer member of the outer wheel bearing 12, and is rigidly secured by bolts placed at its periphery, to inner hub bearing plate 17. Bearing 12 is held in position by hub retaining nut 16 and bearing seat ring 15, and by tightening said nut, any wear in bearings 12 and 13 can be taken up.

Fitting snugly over the outer wheel bearing plate 21 and held firmly attached thereto is wheel hub shell 23, provided with flanges in which the inner ends of the spokes of the rotating road wheels are mounted. Said shell is held in place by bolts 22 passing through the bearing plate securing ears and hub cap 24.

It will be readily seen that the spokes may be mounted directly on the outer hub plate 21, and wheel hub bearing plate 17, thus dispensing with the wheel hub shell 23. It will also be seen that any preferred type of wheel, either wire spoke, wood spoke or disc steel may be readily adapted to this hub. It is only necessary, in order to secure full advantage of this invention, to so design the attached wheel that the point of contact of the tire with the road will be vertical beneath the pivotal center of the axle T-head.

Dust and dirt are excluded from pivot bearing 8, and lubricant is retained therein by dust washer 25, which is of felt or other suitable material, held in position by retaining rings 26 and 27. Likewise, dust washer 28 and retaining rings 29 and 30 perform the same function for pivotal bearing 9. The operation of the wheel in steering is accomplished by the usual attachment of suitable steering gear (not shown) secured to steering arm 31.

Hub cap 24 aids in holding wheel shell 23 in place, also acts as a dust cap to protect bearing 12, and as a grease reservoir for the entire hub. When hub cap 24 is filled with cup grease and screwed in place, grease is forced directly into bearing 12, surplus grease being prevented from escaping by grease washer 34, which is held in position by retaining rings 35 and 36. Grease is also forced along grease groove 32, which becomes a continuous duct when parts 4 and 5 of the steering spindle are clamped together. From groove 32, grease is directed through grooves to bearing 13, surplus grease being prevented from escaping by grease washer 37, held in place by retaining rings 38 and 39, and by dust washer 20. Vertical grease ducts 33 extend upwardly and downwardly in the walls of the steering spindle members 4 and 5, and are connected with groove 32, emerging at suitable points to discharge grease in the bearings 8 and 9, said lubricant being retained in these bearings 8 and 9 by dust washers 25 and 28 respectively.

In the modification shown in Figs. 6, 7, 8 and 9, the parts are identical with those shown in the preferred form, with the exception of the lubricating means.

In place of providing for the forced feeding of the grease through ducts 32 and 33, a liquid lubricant is used and a splash feed, there being means provided for retaining the lubricant within the hub.

The axle 1$^a$ is provided with the T-head 2$^a$. Mounted on said head for oscillation in steering, is the steering spindle 3$^a$. Mounted for rotary movement on bearings 12$^a$ and 13$^a$, supported in outer and inner hub plates 21$^a$ and 17$^a$ respectively, is the hub.

As a retaining means for the lubricant that is in liquid form and is carried up and distributed on top of the spindle and reaches the bearings of the steering spindle, through an opening 3, is a sheet metal shell 40, divided to facilitate assembling, which is adapted to entirely inclose the T-head of the axle, except its extreme ends from which its interior is separated by upper and lower packing rings 41 and 42.

Said shell is also provided with an enlarged, horizontally arranged cylindrical portion 43, having a groove 44 adapted to receive a packing gland 45. Said packing gland acting not only as a lubricant retaining means, but as a dust or other foreign matter excluding medium. The diameter of the enlarged portion 43 of the shell permits the swing of the wheel in steering.

A further slight modification of the device is shown in Figs. 10, 11, 12 and 13. The same structure in all its essential details, it will be seen, is as above described.

The axle 1ᵇ is provided with the T-head 2ᵇ, on which is mounted for oscillating movement, the steering spindle 3ᵇ. Mounted for rotary movement on the spindle are the outer and inner wheel bearings 12ᵇ and 13ᵇ respectively. It will be clearly shown that this specific structure is suggested for extra heavy duty and possesses all the features found in the preferred form.

Having thus described my invention, what I claim as new and desire to secure by Letters Patent is:

1. The combination with a steering wheel having outer and inner hub bearings mounted in hub bearing openings, of an axle having a vertically extending wheel mounting arm located between the hub bearings, an oscillating spindle mounted on the wheel mounting arm, a hub shell mounted on the spindle, said wheel mounting arm being of a length greater than the diameter of the hub bearing openings.

2. An improved steering wheel having outer and inner hub plates, outer and inner hub bearings mounted in hub bearing openings in said hub plates, an oscillating spindle comprised of complementary parts supporting said hub members and an axle having a vertically extending wheel mounting arm located between the limb bearings, of a length greater than the diameter of the hub bearing openings.

3. In a wheel and axle construction, outer and inner hub plates having outer and inner hub bearing openings respectively, bearings mounted in said openings, an axle having a vertically extending wheel mounting arm located between the hub bearings, an oscillating spindle comprising complementary parts, mounted on said wheel mounting arm, said wheel mounting arm being of greater length than the diameter of the hub bearing openings.

4. In combination with a wheel having a hub provided with outer and inner bearings mounted in bearing openings, of an axle having a wheel mounting arm within said hub between said bearings and an oscillating spindle divided horizontally through its center mounted on the arm and supporting said hub, said wheel mounting arm being of a greater length than the diameter of either of the bearing openings.

5. A wheel and axle construction comprising a hub having outer and inner hub plates, each provided with bearings mounted in bearing openings, an oscillating spindle consisting of complementary parts divided horizontally through the center rotatably supporting said hub, an axle having a vertically extending arm arranged within the spindle of a length greater than the diameter of either of the hub bearings and adapted to support the spindle.

6. A wheel and axle construction comprising a built-up hub portion comprising outer and inner hub plates, having outer and inner hub bearings respectively, an axle having a vertically extending wheel mounting arm arranged between the hub bearings, of a length greater than the diameter of either of the hub bearing openings, a spindle comprising complementary parts divided horizontally through the center and having bearings at its ends mounted on said vertical arm, and outer and inner extensions forming outer and inner supports for the hub bearings.

7. In a wheel and axle construction a hub comprising outer and inner hub plates having hub bearings, a lubricant receiving chamber within the hub, an axle having a vertically extending hub mounting arm arranged between the hub bearings, of a length greater than the diameter of the bearings, and an oscillating spindle mounted on said arm provided with bearings adapted to support the hub.

8. A wheel and axle construction, a hub comprising outer and inner hub plates provided with bearings, an oscillating spindle consisting of complementary parts mounted within the hub between the bearings, a lubricant receiving chamber arranged in the hub beneath the spindle, an axle provided with an integral vertically extending arm mounted on upper and lower bearings in the spindle, said arm being of a length greater than the diameter of the hub bearing.

WILLIAM K. McQUOWN.